AUDIO-AMPLIFIER
Filed Oct. 4, 1956
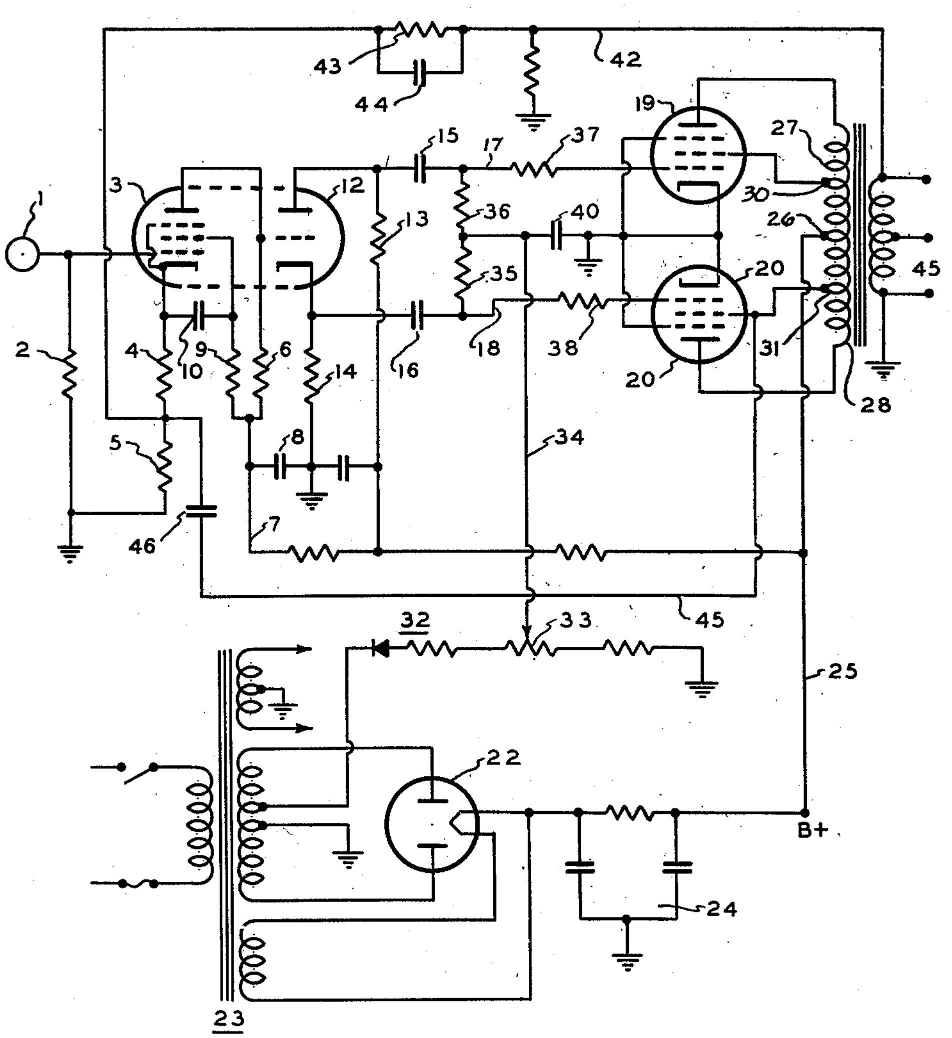
INVENTOR
DAVID HAFLER
BY Hyman Hurvitz
ATTORNEY United States Patent Office 2,815,407
Patented Dec. 3, 1957

2,815,407

AUDIO-AMPLIFIER

David Hafler, Philadelphia, Pa.

Application October 4, 1956, Serial No. 613,891
13 Claims. (Cl. 179—171)

The present invention relates generally to audio amplifiers of the high fidelity type, and more particularly to high fidelity high-gain audio amplifiers having novel feed-back circuits for increasing the band-width of the amplifier response, and the stability of the amplifier over its response band.

It has become conventional, in amplifier design, to provide flat frequency response over the band 20 C. P. S.—20 kc., and distortion figures .1% at normal listening levels and less than 1% at rated output are routine. These specifications do not invariably correlate with audible performance.

Several important factors in addition to low distortion and flat frequency response contribute to listening quality. One of these is transient performance. Good transient performance entails critical damping of an amplifier, so that peaky or pulse-like signals do not cause oscillatory surges which appear at the loud-speaker as spurious signals. Good transient response also requires wide pass-band so that signals of steep wave front are not distorted, and so that no overshoot or ringing will occur, and phase shift be minimized. The recited characteristics are all interrelated with the stability characteristics of an amplifier under feed-back conditions and the regulation characteristics of the power supply employed. If an amplifier is on the verge of instability when speaker loaded, it cannot exhibit good transient performance. If power supply voltages shift as power output varies, there is a change of operating conditions, under dynamic conditions, which entails distortion.

A further requirement is adequate power handling capacity. High power requirements are due to low speaker efficiency, especially in the case of high quality speakers. At frequency extremes the impedance characteristics of loud-speaker systems change from their nominal values, causing severe mismatch and a consequent reduction in undistorted output power of the amplifier.

The output stage of an amplifier in accordance with the present invention consists of two type EL-34 tubes in push-pull, matched at 4300 ohms plate to plate with a transformer arranged in accordance with the teaching of my co-pending application for U. S. patent, Serial No. 540,587, filed October 14, 1955, and entitled "Audio Transformer." This stage, without feed-back is capable of delivering 50 watts of substantially undistorted output, and has a frequency response of ±2db from 6 C. P. S. to 100 kc. Screen loading is employed, and by maintaining this loading at about 10% the inherent linearity of the tubes is retained. In order to maintain optimum transient performance, good power regulation is essential, and also fixed bias is employed, preferably for operating in class $AB_1$. Bias voltage is derived from a relatively low impedance source so that bias will not vary with signal level.

The output stage is driven directly from a phase inverter of the split load type, by employing the triode section of a 6AN8 tube. The sole disadvantage of the split load, or cathanode, phase inverter is that its balance fails at high frequencies. The high frequency response of the cathode section is better than that of the plate section since the cathode is at lower impedance than the plate and is less influenced by the following grid input capacitance. Unbalance results in distortion and also limits the amount of permissible feed-back. It is a feature of the present invention to correct for this unbalance in a simple manner, by introducing a capacitive overall feed-back loop from the plate or screen of the output tube on the side of the circuit which is energized from the cathode of the phase inverter. This capacitor introduces more feed-back at the higher frequencies, so that the circuit has less gain as frequency increases, and may be virtually ineffective below 20 kc. The correction is most effective, then, on the side of the circuit which has the greater high frequency response, and the net result is to balance the signal from the two sides of the phase inverter over the entire frequency range.

The phase inverter is driven by the other half of the 6AN8, which is employed as a high gain voltage amplifier, which with un-bypassed cathode provides a gain of 200. The input capacitance of the pentode is low so that little shunting capacitance exists for attenuating high input frequencies from a high source impedance. The circuit is uncritical as to input source under feed-back conditions because Miller effect is low. The fact that only three stages are employed, due to the high pentode gain, enhances stability under feed-back conditions.

Twenty decibels of feed-back are employed. The amplifier is sufficiently stable to permit use of 40 db of feedback before oscillation would occur. This presents a considerable margin of safety. The stability of the amplifier is such that high frequency ringing does not occur even when driving an electro-static speaker or a long speaker cable.

At low frequencies the fact that only one stage of the amplifier employs coupling capacitors provides a wide margin of stability. The output transformer has 200 henries of primary inductance, which assures a flat response to 6 C. P. S., and low phase shift at low frequencies. Low frequency degeneration is introduced at the screen of the pentode, by providing a .1 $\mu$f. condenser directly between screen and cathode. This is an effective bypass at frequencies above about 10 C. P. S., but reduces gain by degeneration about 16 db from 5 C. P. S. to 1 C. P. S. Stability under feedback conditions is thereby maintained due to the step in the gain characteristic in which gain is reduced without corresponding phase shift.

Briefly describing a preferred embodiment of the invention, a single envelope pentode-triode input and inverter stage is employed, the pentode being plate loaded and directly coupled to the grid of the triode. The latter is connected as a cathanode phase inverter, i. e. with both an anode and a cathode load. The latter loads are condenser coupled to drive a push-pull output or power stage, which may be operated class A, $AB_1$, $AB_2$, or B, although a preferred mode of operation is $AB_1$, to attain high efficiency in the power stage of the amplifier.

The pentode circuit includes a relatively large un-bypassed cathode resistance which provides local negative feedback, and a further un-bypassed resistance of relatively small value which completes two overall negative feedback loops. One of the latter is a conventional RC loop, which derives signal from the secondary winding of the output transformer of the system. The other extends from that side of the primary winding of the output transformer which loads that output tube which is driven from the cathode side of the phase inverter, and consists of a small capacitor (of high impedance at frequencies within the audio band). Unlike the conventional phase-shifting capacitor paralleled across a feedback resistor, this arrangement is a corrective feedback loop which does not include the output transformer. It produces a high frequency roll-off because of the increase in negative feedback at high frequencies. It is effective only above 20 kc. This high frequency roll-off results in diminished gain before the unavoidable phase shifts of the output transformer plus the other stages reach 180°. It is necessary to reduce the gain in greater ratio than feedback before this 180° phase shift point is reached in order to insure stability of the amplifier. One major advantage of using a feedback loop for high frequency roll-off is that the phase shift of stages included inside the loop is reduced so that the entire section encompassed by the capacitive loop tends to simulate the gain and phase characteristics of a single stage. This characteristic, peculiar to the capacitive feedback loop, makes a distinction between it and shunt capacitance, which is commonly used to correct gain and phase characteristics within a feedback loop. It also differs from an RC type of feedback loop since it has no effect in the audio band, while an RC loop is predominantly effective in this band. Further, an RC loop of the parallel type cannot be coupled to a point of high D. C. voltage as can be done with the purely capacitive loop.

A second benefit of the capacitive feedback loop is that it corrects the unbalance inherent in the so-called cathanode type of phase inverter, employed in the system. The cathanode phase inverter has a lower impedance at the cathode terminal than at the plate terminal. The response on the cathode side is therefore more extended at high frequencies because inherent shunt capacities have less effect on the lower impedance. The capacitive feedback loop samples all the signal across the primary of the output transformer, but due to unavoidable decoupling of the two primary halves at very high frequencies there is more correction applied to the output of that side of the output stage which is driven from the cathode side of the inverter. Thus, the two sides of the amplifier are brought more nearly into balance, which increases stability and enhances high frequency performance.

The use of an un-bypassed cathode resistance in the pentode input tube circuit assists in obtaining a wide swing from this tube The use of a pentode tube minimizes Miller effect and makes the input circuit uncritical as to source impedance.

The screen grid of the pentode input tube is capacitively by-passed to its cathode, by a capacitor selected to introduce gain loss and phase return at a low frequency due to inadequate by-passing. Thus, after gain reduction, the phase returns to zero degrees and the total phase shift at low frequencies is limited to that of one set of coupling capacitors and the output transformer. These cannot introduce 180° of phase shift; and since the gain has been reduced by degeneration before there is any approach to the 180° point, there is adequate stability under feedback conditions with no low frequency peaking or oscillation.

It is, accordingly, a primary object of the present invention to provide a novel audio amplifier system.

It is another object of the present invention to provide an audio amplifier having a novel negative feedback loop employing a capacity connected to an output transformer primary winding half.

It is a further object of the present invention to provide a novel pentode input stage for a power amplifier having a screen to cathode by-pass condenser selected to introduce gain loss and phase reversal in the pentode output at sufficiently low audio frequencies.

It is still a further object of the present invention to provide negative feedback which tends to balance a push-pull amplifier output stage which is fed in slightly unbalanced relation, by sensing feedback signal directly from that primary winding half which is fed at reduced amplitude, whereby leakage reactance between primary winding halves reduces feedback voltage from the primary winding half which is fed at enhanced amplitude.

The above and still further objects, features and advantages of the present invention will become apparent upon consideration of the following detailed description of one specific embodiment thereof, especially when taken in conjunction with the accompanying drawings, wherein:

The single figure of the drawings is a schematic circuit diagram of a preferred embodiment of the invention.

Referring now more particularly to the accompanying drawings, the reference numeral 1 denotes an input terminal, from which a grid leak resistance 2 extends to ground. The terminal 1 is directly connected with the control grid of a pentode 3, having in its cathode circuit a relatively high un-bypassed resistance 4 in series with a relatively low un-bypassed resistance 5. The pentode 3 is anode loaded by a resistance 6, connected to a D. C. voltage lead 7, the latter bypassed to ground by a condenser 8. The screen grid of pentode 3 is also loaded by a resistance 9, and directly coupled to cathode by a condenser 10.

The anode of pentode 3 is directly connected to the grid of a triode 12, which occupies the same envelope as the pentode 3. The cathode 12 has an anode load 13, and a cathode load 14 of equal values. Anode output voltage is derived via a coupling capacitor 15, and cathode output voltage via a capacitor 16, the two output voltages being of opposite phases due to their points of derivation.

The impedance at the anode terminal of the triode section 12 is inherently greater than the impedance at the cathode terminal, and therefore at high frequencies shunt capacities have a lesser effect on the cathode circuit. It follows that, while the inverter circuit may be perfectly balanced at low frequencies for which shunt capacities are insignificant, this is no longer true at high frequencies, and at these frequencies the response of the cathode side of the circuit is more extended than the response of the anode side.

The push-pull signal existent at leads 17, 18, is applied to the grids of a pair of push-pull connected pentodes, 9, 20, connected and biased as a push-pull class $AB_1$ power output stage, although class $AB_2$ or class B may be employed instead.

B+ voltage is supplied to the system from a push-pull rectifier 22, driven in conventional fashion from a transformer 23, and filtered by an RC filter 24. The filtered B+ voltage appears on a lead 25, which is connected directly with the center tap or common point 26 of primary winding halves 27, 28. The latter are connected, respectively, in series with the anodes of pentodes 19, 20, and suitably selected screen taps 30, 31, are taken to the screen grids of pentodes 19, 20, approximately 10% screen loading being preferred. The cathodes of pentodes 19, 20 are grounded. The control grids of pentodes 19, 20 are negatively biased from an auxiliary negative bias supply 32, of low internal resistance, having a variable potentiometer 33 to permit bias adjustment. The tap of the potentiometer 33 is connected by a lead 34 to the mid-point of two equal resistances 35, 36, which are connected in series between leads 17, 18, and protective resistances 37, 38 are connected in series with the grids to limit grid current. A large condenser 40 by-passes the lead 34 to the cathodes of pentodes 19, 20 while providing D. C. isolation, and the grid bias is, by virtue of the arrangement described, fixed in value as amplifier output varies.

An RC negative feed-back loop 42, including a resistance 43 and a condenser 44 in parallel, is provided between the secondary winding 45 of the output transformer and the junction of cathode resistances 4, 5. This feed-back loop is conventional and is effective over the band 6 C. P. S. to 20 kc.

A further capacitive feed-back loop 45 is provided between the screen grid of pentode 20 and the junction of resistances 4, 5. This feed-back loop includes a condenser 46, and 46 is selected to attain negligible reactance at about 20 kc. Below that value of frequency the capacitive loop is largely ineffective, and above that value the RC loop, of itself, would introduce instability under some conditions of operation.

The capacitive feed-back loop, including condenser 46, may be coupled directly to the anode of pentode 20, or to any other point of the primary half associated with pentode 20, such as the screen tapping point 31, which implies large voltage excursions, while the use of a condenser only as distinguished from a parallel RC coupling element effectively isolates B+ voltage from the feed-back loop. The condenser 46 is of relatively critical value. Where the capacitive loop derives from the screen of pentode 20, condenser 46 may be 390 mmf. but where it derives from the plate may be 82 mmf. The value of condenser 46 is selected, in accordance with the overall design of the system, to provide high frequency roll-off because of the increase in negative feed-back as frequency increases, at values for which the RC loop becomes ineffective. At high values of frequency, the gain and phase characteristics of the amplifier up to the output transformer are thus modified in such a way that there is less phase shift for a given amount of gain reduction than would otherwise occur. This increases stability when the external RC feedback loop which includes the output transformer is added, so that the latter does not cause instability or oscillation under any operating condition. Either feedback loop alone is inadequate, while the two together permit substantial feedback without evidences of instability. The two overall feedback loops thus complement each other and provide performance superior to that obtainable by either alone, and in fact performance unattainable by either one alone for any feasible design.

The fact that the feed-back loop 45 derives signal directly from primary winding half 28, and by induction from primary winding half 27 implies that feed-back signal will be greater in the former case than in the latter, because some leakage reactance exists between primary halves. This slight unbalance of feed-back compensates for the slight unbalance of input signal to the pentodes 19, 20 due to the impedance unbalance as between anode and cathode terminals of inverter triode 12.

The cathode resistance 4 provides local degeneration for the pentode 3 permitting a wide swing of input signal without distortion, and the use of an input pentode minimizes Miller effect and renders the input circuit uncritical as to source impedance.

The by-pass condenser 10 (.1 mf.) is selected to provide inadequate by-pass at extremely low frequencies, i. e. below 6 C. P. S. It therefore introduces a phase reversed current into the pentode output at these low frequencies (1–6 C. P. S.) which increases as frequency decreases. By suitable selection of the value of capacitor 10, it has been found that compensation may be effected for the phase characteristics of coupling capacitors 15, 16 and for the phase shift introduced by the output transformer at low frequencies. This prevents an overall phase shift of 180°, at very low frequencies, and in fact maintains the maximum phase shift at the lowest frequency of interest, i. e., down to 1 C. P. S. and below, at considerably less than 180°.

The distinction between a capacitive feedback loop and other methods of phase compensation is of primary importance for a proper understanding of the present invention. The compensation by shunt capacitance also rolls off high frequency response. However, it does not effect correction of the phase characteristic of stages within the loop, which is accomplished by the capacitive feedback loop. It follows that, for the amount of feedback employed, the parallel feed-back loop would cause instability, under some conditions of operation, were it not for the concurrent use of a capacitive feed-back loop, so designed as to be complementary to the parallel RC loop.

The screen by-pass in the pentode circuit eliminates screen degeneration, except at extremely low frequencies. At low frequencies, about 5 C. P. S., where capacitor reactance is high, there is degeneration and gain levels off, phase shift returning to zero. Thus, by the time the amplifier, in toto, reaches 180° of phase shift, there is so little gain that complete low frequency stability is retained.

Flat response over the band 6 C. P. S. to 60 kc. is attained, by the low and high capacitive overall feed-back loops, and by the feed-back internally of the first stage. The first stage feed-back provides stability at low frequencies, i. e. below 6 C. P. S. and the capacitive loop at high frequencies, i. e. above 20 kc. In the intermediate range the RC feed-back circuit controls, but at the extremes of frequency the capacitive feed-back circuits assume preponderant control.

Values of circuit elements employed in one practical embodiment of the invention are as follows:

| | | |
|---|---|---|
| Tube types: | | |
| **3, 12** | | 6AN8 |
| **19, 20** | | 6CA 7/EL–34 |
| Resistances: | | |
| **2** | | 470K |
| **4** | | 680 |
| **5** | | 47 |
| **6** | | 270K |
| **9** | | 1.2 MEG |
| **13** | | 47K |
| **14** | | 47K |
| **35** | ohms | 1000 |
| **36** | do | 1000 |
| **37** | do | 1000 |
| **38** | do | 1000 |
| **43** | do | 1000 |
| Condensers: | | |
| **10** | mf | .1 |
| **8** | mf | 20 |
| **15, 16** | mf | .25 |
| **40** | mf | 100 |
| **46** | mmf | 82 |

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. An audio amplifier including a single ended pentode pre-amplifier stage having a resistive anode load and an un-bypassed cathode resistance, a cathanode phase inverter connected in cascade with said pre-amplifier stage, a push-pull power amplifier driven by said phase inverter such that one side of said power amplifier is driven from the cathode of said cathanode phase inverter and the other side of said power amplifier is driven from the anode of said cathanode phase inverter, said push-pull power amplifier including an output transformer having two primary halves each connected in one of said sides, and means comprising a condenser connected between one of said primary halves and said un-bypassed cathode resistance, said one of said primary halves being that one which is driven from said cathode of said cathanode phase inverter.

2. An audio amplifier including a single ended pre-amplifier stage including a first tube having a resistive anode load and an un-bypassed cathode resistance, a second stage comprising a cathanode phase inverter driven by said pre-amplifier, said cathanode phase inverter providing balanced output signals at low audio frequencies and progressively more unbalanced output at progressively higher audio frequencies due to inherent capacitive unbalance between the sides of said cathanode phase inverter, a push-pull output stage driven in balanced circuit relation by said cathanode phase inverter and having a two sided transformer output circuit having leakage reactance between the sides and means including a feed-back loop from one side of said transformer output circuit to said cathode resistance, said feed-back loop connected between one side of said transformer output circuit and said cathode resistance, said one side being that side which is driven from the cathode of said cathanode phase inverter.

3. An audio amplifier including a pre-amplifier stage having a terminal for insertion of a negative feed-back signal, a phase inverter including a vacuum tube having an anode and a cathode, and equal resistive loads in circuit with said anode and with said cathode, respectively, said anode and cathode presenting different capacitive reactance to ground and therefore different extent of high frequency response, a push-pull amplifier driven by said inverter, said push-pull amplifier including a first tube driven from the anode of said inverter and a second tube driven from the cathode of said inverter, said first and second tubes having anodes, an output transformer primary winding having two halves, said halves having leakage reactance therebetween, each being connected in series with a different one of said second anodes, and means for coupling the primary winding half which is in series with the anode of said second tube to said terminal for insertion of a negative feed-back signal, said last means comprising a condenser and a lead connecting said condenser from a point of the last mentioned primary winding half to said terminal, said condenser and said point being selected to compensate for said different extent of high frequency responses of said anode and cathode circuits of said phase inverter.

4. A high fidelity audio amplifier including a first stage, and an output stage in cascade, said first stage including a pentode amplifier tube, said pentode amplifier tube having a cathode, a control grid, a screen grid and an anode, a first cathode resistance selected for introducing internal negative feed-back into said first stage, a second cathode resistance selected for introducing external negative feed-back from said output stage into said first stage, said first cathode resistance connected between said cathode and said second cathode resistance, said second cathode resistance connected between said first cathode resistance and a point of reference potential, means for applying a band of audio signals to said control grid, a first resistive load for said anode, a second resistive load for said screen grid, a source of B+ voltage, said first resistive load and said second resistive load being connected in parallel as seen from said source of B+ voltage, a coupling condenser connected between said cathode and said screen grid, said coupling condenser having relatively high reactance in the range 0 to approximately 10 C. P. S., and relatively lower reactance at frequencies above approximately 10 C. P. S., and means for deriving relativley low frequency negative feed-back voltage from said third stage and applying said negative feed-back voltage to the junction of said first and second cathode resistances, said stages having an overall phase shift versus frequency characteristic such as to introduce danger of instability in response to said feed-back voltage at frequencies below approximately 10 C. P. S., said coupling condenser having a value so selected in relation to the operating parameters of said audio amplifier including said overall phase shift versus frequency characteristic as to introduce at least sufficient screen degeneration at said screen grid to eliminate said instability.

5. The combination in accordance with claim 4 wherein said audio amplifier includes an intermediate stage, said intermediate stage being a cathanode phase inverter having a second control grid, a second cathode and a second anode, a direct connection between said control grid of said intermediate stage and said anode of said first stage, a cathode load for said second cathode, an anode load for said second anode, said cathode and anode loads being equal, said phase inverter being inherently balanced for relatively low frequencies and being inherently capacitively unbalanced for relatively high frequencies, and means for compensating for the latter unbalance comprising an external feed-back loop arranged to introduce A. C. feed-back signals having sequentially opposite polarities, and in which one of said polarities is fed back in different amplitude than the other of said polarities when said signals of two polarities correspond with and are responsive to input signals of opposite polarities applied to said first stage in equal amplitudes.

6. A high fidelity audio amplifier, comprising a first, a second and a third stage, said stages all coupled in cascade, said first stage including a pentode amplifier tube having a plate, a screen grid, a control grid and a cathode, a plate resistance in series with said plate, a source of B+ voltage for said plate connected in series with said plate resistance, a cathode resistance of approximately 700 ohms in series between said cathode and ground, a screen resistive load connected between said source of B+ voltage and said screen grid and in parallel with said plate resistance, a coupling capacitor connected directly between said screen grid and said cathode, said coupling capacitor having relatively low reactance only down to approximately 6 C. P. S. and becoming of increasing relatively higher reactance below approximately 6 C. P. S. wherein said second stage is a cathanode phase inverter and includes a triode tube in the same envelope as said pentode tube, said triode tube having an anode, grid and cathode, a resistive load coupling said anode of said triode to said source of B+ voltage, a resistive cathode load connecting said cathode of said triode to ground, said loads being equal, a direct D. C. connection of substantially zero impedance between the anode of said pentode and the grid of said triode, and output leads connected to the plate and cathode of said triode for providing push-pull signal output, said cathanode phase inverter having inherent capacitive unbalance between sides above about 20 kc. due to difference of capacities to ground of said anode and said cathode of said triode tube, and negative unbalanced feed-back signal means coupled from said third stage to a point of said cathode resistance for feeding back a signal of such magnitude and phase as to balance the overall response of said audio amplifier by compensating for the inherent unbalance of said cathanode phase inverter.

7. The combination in accordance with claim 6, wherein said third stage is a push-pull power output stage employing two screen grid and anode loaded pentodes, means for driving said pentodes in push-pull relation from said output leads, means for providing a fixed voltage negative bias for said pentodes, an output transformer connected in push-pull relation to said pentodes, said output winding having a primary winding and a secondary winding having appreciable leakage reactance therebetween, an overall RC negative feed-back loop connected between a point of said secondary winding and said point of said cathode resistance, said RC feed-back loop including a resistance and a capacity in parallel which are selected to provide at least 15 db of feed-back over the band 6 C. P. S. to 20 kc., said compensatorily unbalanced feed-back loop being a further overall negative feed-back loop between a point of that primary winding which is in series with that pentode which is driven from the cathode of said phase inverter and said point of said cathode resistance, said further overall negative feed-back loop consisting of a condenser attaining negligible impedance at about 20 kc.

8. A high fidelity audio amplifier, comprising a first, second and third stage, said stages coupled in cascade, the first stage being a pre-amplifier stage and including a pentode amplifier tube having a plate, a screen grid, a control grid and a cathode, a plate resistance of approximately 270 kilohms in series with said plate, a source of B+ voltage for said plate connected to said plate via said plate resistance, an un-bypassed first cathode resistance of approximately 680 ohms, a second un-bypassed cathode resistance of approximately 47 ohms, said first and second cathode resistance being connected in series in the stated order from said cathode to a point of reference potential, a screen load of approximately 1.2 megohms connected directly between said source of B+ voltage and said screen grid, and a coupling capacitor of approximately .1 microfarad connected between said screen grid and said cathode, wherein said second stage includes a triode tube having an anode, cathode and grid, a resistive anode load coupling said anode of said triode to said source of B+ voltage, a resistive cathode load connecting said cathode of said triode to a point of reference potential, said resistive anode and cathode loads being equal, a direct D. C. connection of zero impedance between the anode of said pentode and the grid of said triode, and output leads connected to the plate and cathode of said triode for providing push-pull signal output, said cathode load resistance having a value of approximately 47 kilohms, and the pentode-triode tube type being 6AN8, or equivalent, said third stage being a push-pull power output stage employing two screen grid and anode loaded output pentodes, of the 6CA7/EL–34 type, or equivalent, means biasing said pentodes for class AB operation with fixed bias, an output transformer having balanced primary windings connected in push-pull relation to and respectively in series with the anodes and screen grids of separate ones of said output pentodes, one of said output pentodes being driven from said lead coupled to the cathode of said triode, and a feed-back circuit connected between a point of the primary winding connected in series with the anode of said one of said output pentodes and the junction of said first and second cathode resistances.

9. The combination according to claim 8 wherein said last mentioned feed-back circuit is a condenser having a value of less than approximately 500 mmf.

10. The combination according to claim 8 wherein said output transformer includes a secondary winding, and wherein is provided a further degenerative feed-back connection from an ungrounded point of said secondary winding to said junction to said first and second cathode resistances, said further degenerative feed-back loop including in parallel a resistance of approximately 1000 ohms and a capacitor.

11. In a multi-stage amplifier, a pre-amplifier, a cathanode phase splitter stage having inherent capacitive unbalance between sides and a balanced power output stage, said stages being coupled in cascade, said power output stage including an output transformer having balanced primary windings including some interwinding leakage inductance, and a secondary winding, a first degenerative feed-back connection from a point of one of said primary windings to a point of said pre-amplifier, a second degenerative feed-back connection from a point of said secondary winding to a point of said pre-amplifier, said second degenerative feed-back connection including a resistance and a condenser in parallel, said first degenerative feed-back connection comprising a coupling capacitor having negligible reactance above the audio frequency band only and a capacity of not more than 500 mmf., said leakage inductance, said point of one said primary windings and the value of said capacity being together selected to compensate for said inherent capacitive unbalance between sides of said cathanode phase splitter stage.

12. In an audio amplifier, a voltage amplifier stage including a vacuum tube having an anode, a screen grid and a cathode, a source of B+ voltage, an anode load resistance connected between said source of B+ voltage and said anode, an inverter stage connected in cascade with said voltage amplifying stage, a push-pull amplifier stage connected in cascade with said inverter stage, an external feed-back loop extending from said push-pull power amplifier stage back to said voltage amplifier stage, said cascaded stages including coupling capacitance and an output transformer which together introduce progressively increasing phase shifts in one sense with decrease of sub-audio frequency, said phase shifts and the amplitude of the feed-back signal provided by said degenerative feed-back loop being such that instability exists below a predetermined sub-audio frequency and means to eliminate said instability comprising means for generating in said voltage amplifier stage a further internal degenerative feed-back signal of phase shift progressively increasing in a sense opposite to said one sense with decrease of said sub-audio frequencies and of amplitude increasing with decrease of said sub-audio frequencies at least sufficiently to eliminate said instability, said last means including a resistance load connected in series between said source of B+ voltage and said screen grid and in parallel with said anode load resistance as seen from said source of B+ voltage, and a by-pass condenser, and means connecting said by-pass condenser between said screen grid and said cathode, said by-pass condenser having such value in relation to the operating parameters of said voltage amplifier stages and of said audio amplifiers as to generate said further degenerative feed-back signals at said screen grid.

13. In an audio amplifier having a plurality of cascaded stages and having a predetermined open loop overall phase shift characteristic as a function of frequency which introduces danger of instability at frequencies below approximately 10 C. P. S., means for compensating for said phase shift characteristic comprising means for generating an internal degenerative feed-back signal having an overall phase shift and amplitude characteristic as a function of frequency which is compensatory of said first recited phase shift characteristic at least sufficiently to eliminate said instability, said last means comprising a vacuum tube in a first of said cascaded stages having an anode, a cathode and a screen grid, a source of B+ voltage, a resistive load for said screen grid between said source of B+ voltage and said screen grid, an anode load in series between said source of B+ voltage and said anode, said resistive loads being connected in parallel as seen from said source of B+ voltage, and means for reducing voltage variations at said screen grid with respect to said cathode to a relatively low value for all frequencies above approximately 10 C. P. S. and for introducing relatively higher and progressively increasing degenerative voltage variations at said screen grid for frequencies increasing below about 10 C. P. S., said last means consisting of a condenser connected between said screen grid and said cathode, and having its value so selected in relation to the operating parameters of said audio amplifier as to eliminate said instability for all said frequencies below about 10 C. P. S. by generating said internal degenerative feed-back signal at said screen grid in sufficient amplitude and at such phase as to be at least compensatory of said first recited phase shift characteristic.

References Cited in the file of this patent

UNITED STATES PATENTS

| | | |
|---|---|---|
| 2,246,158 | Worcester | June 17, 1941 |
| 2,510,683 | Carpentier | June 6, 1950 |
| 2,566,508 | Zeidler | Sept. 4, 1951 |

OTHER REFERENCES

"Radio & Television News," March 1955, pages 45–47 and page 132, article "New British Power Amplifier" (Fig. 1).

"Electronics," April 1955, "Circuit Design Factors for Audio Amplifiers," by M. V. Kiebert, Jr., pages 166–171.